US008447767B2

(12) United States Patent
Ah-Pine et al.

(10) Patent No.: US 8,447,767 B2
(45) Date of Patent: May 21, 2013

(54) SYSTEM AND METHOD FOR MULTIMEDIA INFORMATION RETRIEVAL

(75) Inventors: Julien Ah-Pine, Lyons (FR); Stéphane Clinchant, Grenoble (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 41 days.

(21) Appl. No.: 12/968,796

(22) Filed: Dec. 15, 2010

(65) Prior Publication Data

US 2012/0158739 A1  Jun. 21, 2012

(51) Int. Cl.
*G06F 17/30* (2006.01)

(52) U.S. Cl.
USPC .......................................... 707/748; 706/54

(58) Field of Classification Search
USPC .......................................... 707/748; 706/54
See application file for complete search history.

(56) References Cited

U.S. PATENT DOCUMENTS

| | | | |
|---|---|---|---|
| 7,099,860 | B1 | 8/2006 | Liu et al. |
| 7,242,810 | B2 | 7/2007 | Chang |
| 2004/0267740 | A1 | 12/2004 | Liu et al. |
| 2005/0050086 | A1 | 3/2005 | Liu et al. |
| 2006/0239591 | A1 | 10/2006 | Kim |
| 2007/0005356 | A1 | 1/2007 | Perronnin |
| 2007/0067345 | A1* | 3/2007 | Li et al. .................. 707/104.1 |
| 2007/0258648 | A1 | 11/2007 | Perronnin |
| 2008/0010275 | A1 | 1/2008 | Lee |
| 2008/0069456 | A1 | 3/2008 | Perronnin |
| 2008/0250011 | A1 | 10/2008 | Haubold et al. |
| 2009/0076800 | A1 | 3/2009 | Li et al. |
| 2009/0144033 | A1 | 6/2009 | Liu et al. |
| 2010/0082615 | A1 | 4/2010 | Clinchant et al. |
| 2010/0092084 | A1 | 4/2010 | Perronnin et al. |
| 2010/0098343 | A1 | 4/2010 | Perronnin et al. |
| 2010/0189354 | A1 | 7/2010 | de Campos et al. |

OTHER PUBLICATIONS

Kennedy et al., "Query-Adaptvie Fusion for Multimodal Search", 2008, IEEE.*
Lee et al., "Adaptive Learning for Multimodal Fusion in Video Search", 2009, Springer-Verlag.*

(Continued)

*Primary Examiner* — James Trujillo
*Assistant Examiner* — Dawaune Conyers
(74) *Attorney, Agent, or Firm* — Fay Sharpe LLP

(57) ABSTRACT

A system and method for information retrieval are disclosed. The method includes querying a multimedia collection with a first component of a multimedia query (e.g., a text-based part of the query) to generate first comparison measures between the first component of the query and respective objects in the collection for a first media type (e.g., text). The multimedia collection is queried with a second component of the multimedia query (e.g., an image-based part of the query) to generate second comparison measures between the second component of the query and respective objects in the collection for a second media type (e.g., visual). An aggregated score for each of a set of objects in the collection is computed, based on the first comparison measure and the second comparison measure for the object. This includes applying an aggregating function to the first and second comparison measures in which a first confidence weighting is applied to the first comparison measure and a second confidence weighting is applied to the second comparison measure. The first confidence weighting is independent of the second comparison measure. The second confidence weighting is dependent on the first comparison measure. Information based on the aggregated scores is output.

20 Claims, 7 Drawing Sheets

OTHER PUBLICATIONS

Ah-Pine et al., "Crossing textual and visual content in different application scenarios", 2008, Springer Science.*
Omhover et al., "Combining text and image retrieval", 2009, LIP6.*
Csurka, et al., "Visual Categorization with Bags of Keypoints," ECCV Workshop on Statistical Learning in Computer Vision, 2004.
Perronnin, et al., "Fisher kernels on visual vocabularies for image categorization," in Proceedings of the Conference on Computer Vision and Pattern Recognition (CVPR), 2007.
Perronnin, et al., "Large-scale image categorization with explicit data embedding," in CVPR 2010.
Perronnin, et al., "Large-scale image retrieval with compressed fisher vectors," in CVPR 2010.
Lowe, "Object Recognition From Local Scale-Invariant Features", ICCV (International Conference on Computer Vision), 1999.
Mikolajczyk, et al., in "A Performance Evaluation of Local Descriptors", in CVPR, Jun. 2003.
Clinchant, et al. "XRCE's Participation in Wikipedia Retrieval, Medical Image Modality Classification and Ad-hoc Retrieval Tasks of ImageCLEF 2010" in Proc. CLEF (Notebook Papers/LABs/Workshops), Conference on Multilingual and Multimodal Information Access Evaluation, Sep. 20-23, 2010.
Clinchant, et al. "Information-based models for Ad Hoc IR," in SIGIR '10: Proc. 33rd Int'l ACM SIGIR Conf. on Research and Development in Information Retrieval, pp. 234-241 (ACM New York 2010).
Ponte, et al., "A language modeling approach to information retrieval," in SIGIR, pp. 275-281 (ACM 1998).
Clinchant, et al. "XRCE's participation to ImageEval," ImagEVAL 2006 Workshop, Jul. 12, 2007.
Mensink, et al. "Trans Media Relevance Feedback for Image Autoannotation," *TMRF for Image Autoannotation*, 2010.
Popescu, et al. "Overview of Wikipedia Retrieval Task at ImageCLEF 2010," Conference on Multilingual and Multimodal Information Access Evaluation, Sep. 20-23, 2010.
Bressan, et al. "Travel Blog Assistant system (TBAS)—An Example Scenario of How to Enrich Text with Images and Images with Text using Online Multimedia Repositories," 2008.
Mensink, et al. "LEAR and XRCE's participation to Visual Concept Detection Task—ImageCLEF 2010," Conference on Multilingual and Multimodal Information Access Evaluation, Sep. 20-23, 2010.
Clinchant, et al. "XRCE's Participation in Wikipedia Retrieval Task of ImageCLEF 2010," Conference on Multilingual and Multimodal Information Access Evaluation, Sep. 20-23, 2010.
Fusion Task—www.imageclef.org/2010/ICPP/Fusion accessed Sep. 27, 2010.
The MIRFLICKR-25000 Image collection—http://press.liacs.nl/mirflickr/ accessed Sep. 27, 2010.
Detyniecki. "Fundamental on Aggregation Operators," AGOP Asturias 2001.
U.S. Appl. No. 12/872,105, filed Aug. 31, 2010, Mensink, et al.
U.S. Appl. No. 12/710,783, filed Feb. 23, 2010, Ah-Pine, et al.
Ah-Pine. "Data fusion in information retrieval using consensus aggregation operators," In Web Intelligence, pp. 662-668, 2008.
Berger, et al. "Information retrieval as statistical translation," in Proceedings of the 1999 ACM SIGIR Conference on Research and Development in Information Retrieval, pp. 222-229, 1999.
Clinchant, et al. "Lexical entailment for information retrieval," In Advances in Information Retrieval, 28th European Conference on IR Research, ECIR 2006, London, UK, Apr. 10-12, pp. 217-228.
Clinchant, et al. "Multi-language models and meta-dictionary adaptation for accessing multilingual digital libraries," In Evaluating Systems for Multilingual and Multimodal Information Access, 9th Workshop of the Cross-Language Evaluation Forum, CLEF 2008, Sep. 17-19, 2008.
Dagan, et al. "The PASCAL recognising textual entailment challenge," In PASCAL Challenges Workshop for Recognizing Textual Entailment, 2005.
Dunning. "Accurate methods for the statistics of surprise and coincidence," Computational Linguistics, 19(1):61-74, 1993.
Forman. "An extensive empirical study of feature selection metrics for text classification," Journal of Machine Learning Research, 3:1289-1305, 2003.
Glickman, et al. "A probabilistic classification approach for lexical textual entailment," in Proceedings of the Twentieth National Conference on Artificial Intelligence (AAAI-05), 2005.
Harter. "A probabilistic approach to automatic keyword indexing," Journal of the American Society for Information Science, 26, 1975.
Jaakkola, et al. "Exploiting generative models in discriminative classifiers," in Advances in Neural Information Processing Systems 11, 1999.
Lazebnik, et al. "Beyond bags of features: Spatial pyramid matching for recognizing natural scene categories," in CVPR, 2006.
Ah-Pine, et al. "Leveraging image, text and cross-media similarities for diversity-focused multimedia retrieval," vol. 32 of The Information Retrieval Series. Müller, et al, editors. Springer, 2010.
Müller, et al. "Overview of the CLEF 2010 medical image retrieval track," in Working Notes of CLEF 2010, Padova, Italy, 2010.
Singhal, et al. "Pivoted document length normalization," In SIGIR '96: Proceedings of the 19th annual international ACM SIGIR conference on Research and development in information retrieval, pp. 21-29, New York, NY, USA, 1996.
Yang, et al. "A comparative study on feature selection in text categorization," in Proceedings of ICML-97, 14th International Conference on Machine Learning, pp. 412-420, 1997.
Clinchant, et al. "XRCE's Participation to ImageCLEFphoto 2007," CLEF (Cross-Language Evaluation Forum), Sep. 19-21, 2007.
Grubinger, et al. "Overview of the ImageCLEFphoto 2007 photographic retrieval task," in Advances in Multilingual and Multimodal Information Retrieval, Lecture Notes in Computer Science, 2008, vol. 5152/2008, 433-444.
Escalante, et al. "Late Fusion of Heterogeneous Methods for Multimedia Image Retrieval," Proceeding of the 1st ACM International Conference on Multimedia Information Retrieval (MIR), 2008.
Caicedo, et al. "Combining visual features and text data for medical image retrieval using latent semantic kernels ," in Proceedings of the International Conference on Multimedia Information Retrieval (MIR '10), Mar. 29-31, 2010.
Lew, et al. "Content-based Multimedia Information Retrieval: State of the Art and Challenges," in ACM Transactions on Multimedia Computing, Communications, and Applications, Feb. 2006.
Rasiwasia, et al. "A New Approach to Cross-Modal Multimedia Retrieval," ACM Multimedia 2010 (MM '10), Oct. 25-29, 2010.
Sivic, et al. "Video Google: A Text Retrieval Approach to Object Matching in Videos," in Proceedings of the Ninth IEEE International Conference on Computer Vision (ICCV '03)—vol. 2, 2003.
Zhai, et al. "A study of smoothing methods for language models applied to information retrieval," in Journal ACM Transactions on Information Systems (TOIS), vol. 22, Issue 2, Apr. 2004.
Kludas, et al. "Information Fusion in Multimedia Information Retrieval," *Adaptive Multimedial Retrieval: Retrieval, User, and Semantics*, 2007.
Ah-Pine, et al. "Comparison of Several Combinations of Multimodal and Diversity Seeking Methods for Multimedial Retrieval," Multilingual Information Access Evaluation II. Multimedia Experiments Lecture Notes in Computer Science, 2010, vol. 6242/2010, 124-132.

* cited by examiner

SYSTEM AND METHOD FOR MULTIMEDIA INFORMATION RETRIEVAL

CROSS REFERENCE TO RELATED PATENTS AND APPLICATIONS

The following reference, the disclosure of which is incorporated herein by reference in its entirety, is mentioned:

U.S. application Ser. No. 12/872,105, filed on Aug. 31, 2010, entitled RETRIEVAL SYSTEMS AND METHODS EMPLOYING PROBABILISTIC CROSS-MEDIA RELEVANCE FEEDBACK, by Thomas Mensink, et al.

BACKGROUND

The exemplary embodiment relates to information retrieval and finds particular application in connection with multimedia information retrieval.

Retrieval systems enable selective retrieval of digital objects (e.g., text documents, images, audio files, video files, sound recordings, multimedia documents such as web pages, and the like) from a database (for example, a dedicated database, Internet accessible database content, or some other collection of documents). Retrieval systems can be useful as stand-alone systems, for example being employed by a user to retrieve documents of interest to the user, or can serve as component of another system, such as an object annotation system. To retrieve digital objects, a query is submitted which may be textual, e.g., keywords, or non-textual, such as an image or information extracted from an image. The retrieval system may output the top K most similar objects which are responsive to the query.

Digital information is no longer mono-modal. Web pages can contain text, images, animations, sound and video. Photographs on photo-sharing websites often have tags and comments. The same is true for corporate documents and document collections. This shift in the way content is stored has generated a need for tools that enable interaction with multi-modal information.

Retrieval systems have been developed which provide multimedia functionality. These systems retrieve objects that include content of more than one type of medium. One multimedia retrieval method employs a query including information represented by two or more different media types. For example, a query which includes both textual and visual parts. The textual part of the query is used to access the textual component of the objects being queried and the visual component of the query is used to access the visual component of the objects. Another multimedia retrieval operation uses cross-media relevance querying in which a query whose content is of purely one media type (e.g., a stand-alone image) is used to retrieve multimedia objects, based on their relevance to the mono-modal query. The non-queried textual content of the multimedia objects retrieved is then used to form further queries.

One problem which arises in combining the results of two types of query is how to fuse the results to provide meaningful multimedia information retrieval. Current data fusion techniques, such as late fusion methods, use a weighting scheme to try to account for the relative importance of the two types of media, such as text and images, to the query. However, the results of the search can be highly dependent on the weights used and the type of database in which the search is performed.

INCORPORATION BY REFERENCE

The following references, the disclosures of which are incorporated herein in their entireties by reference, are mentioned.

The following relate to multi-modal fusion methods: U.S. Pub. No. 2004026774, published Dec. 30, 2004, entitled MULTI-MODAL FUSION IN CONTENT-BASED RETRIEVAL, by Ching-Yung Lin; and U.S. Pat. No. 7,242,810, issued Jul. 10, 2007, entitled MULTIMODAL HIGH-DIMENSIONAL DATA FUSION FOR CLASSIFICATION AND IDENTIFICATION, by Edward Y. Chang.

The following relate to mono-modal and cross-modal information retrieval: U.S. Pub. No. 20080010275, published Jan. 10, 2008, entitled METHOD, SYSTEM, AND MEDIUM FOR RETRIEVING PHOTO USING MULTI-MODAL INFORMATION, by Jae Won Lee; U.S. Pub. No. 20060239591, published Oct. 26, 2006, entitled METHOD AND SYSTEM FOR ALBUMING MULTIMEDIA USING ALBUMING HINTS, by Sangkyun Kim; U.S. Pub. No. 20080250011, published Oct. 9, 2008, entitled METHOD AND APPARATUS FOR QUERY EXPANSION BASED ON MULTIMODAL CROSS-VOCABULARY MAPPING, by Alexander Haubold, et al.; U.S. Pub. No. 20050050086, published Mar. 3, 2005, entitled APPARATUS AND METHOD FOR MULTIMEDIA OBJECT RETRIEVAL, by Jinsong Liu, et al.; U.S. Pub. No. 20090076800, published Mar. 19, 2009, entitled DUAL CROSS-MEDIA RELEVANCE MODEL FOR IMAGE ANNOTATION, by Mingjing Li, et al.; and U.S. Pub. No. 20100082615, published Apr. 1, 2010, entitled CROSS-MEDIA SIMILARITY MEASURES THROUGH TRANS-MEDIA PSEUDO-RELEVANCE FEEDBACK AND DOCUMENT RE-RANKING, by Stéphane Clinchant, et al. U.S. application Ser. No. 12/710,783, filed on Feb. 23, 2010, entitled SYSTEM AND METHOD FOR INFORMATION SEEKING IN A MULTI-MEDIA COLLECTION, by Julien Ah-Pine, et al.

BRIEF DESCRIPTION

In accordance with one aspect of the exemplary embodiment, a method for multimedia information retrieval includes querying a multimedia collection with a first component of a multimedia query to generate first comparison measures between the first query component and respective objects in the collection for a first media type. At least a part of the multimedia collection is queried with a second component of the multimedia query to generate second comparison measures between the second query component and respective objects in the collection for a second media type. An aggregated score for each of a set of objects in the collection is computed based on the first comparison measure and the second comparison measure for the object. The computing includes applying an aggregating function to the first and second comparison measures in which a first confidence weighting is applied to the first comparison measure which is independent of the second comparison measure and a second confidence weighting is applied to the second comparison measure which is dependent on the first comparison measure. Information based on the aggregated scores is output.

In accordance with another aspect of the exemplary embodiment, a system for multimedia information retrieval includes a search engine for querying an associated multimedia collection with a first component of a multimedia query and for querying at least a part of the queried multimedia collection with a second component of the multimedia query. A first comparison component generates a first comparison measure between the first query component and a respective object in the collection for a first media type. A second comparison component generates a second comparison measure between the second query component and a respective object in the collection for the second media type. A multimedia scoring component generates aggregated scores for each of a set of objects in the collection based on the first comparison measure and the second comparison measure for the respective object. The multimedia scoring component applies an aggregating function to the first and second comparison measure in which a first confidence weighting is applied to the first comparison measure and a second confidence weighting is applied to the second comparison measure. The first confidence weighting is independent of the second comparison measure and the second confidence weighting is dependent on the first comparison measure. A processor implements the search engine, first and second comparison components, and multimedia scoring component.

In accordance with another aspect of the exemplary embodiment, an information retrieval method includes retrieving a set of objects from a collection based on computed text-based scores for the objects and computing image-based scores for the retrieved objects. An aggregated score is computed for objects in the retrieved set of objects based on the respective text-based and image-based scores in which a first confidence weighting is applied to the text-based score which is independent of the image-based score and a second confidence weighting is applied to the image-based score which is dependent on the text-based score. Information based on the aggregated scores is output.

DETAILED DESCRIPTION

Aspects of the exemplary embodiment relate to a system and method for multimedia retrieval. The exemplary method is capable of combining two or more different types of information that are related to two different media representing the same multimedia object. Such a method facilitates searching a multimedia collection in a more effective way than mono-media systems or multimedia systems based on existing fusion techniques.

Multimedia objects, as used herein, are digital objects which contain two or more media types (modalities) which are accessible electronically, such as web pages, text documents containing images, videos, combinations thereof, and the like. Examples of media types include textual media, visual media, sound recordings, and the like. However, individual media types may also include subcategories of these broad categories, such as graphical images and photographic images, structured and unstructured text documents, and the like, whose semantic content is accessible through different types of query.

By way of example, reference is made to multimedia objects which include two types of media: a textual part (e.g., captions, descriptions, tags, OCR-processable content, and the like) which can be queried with a textual query comprising one or more words, and a visual part (still images, such as photographic images, graphical images, and charts, video images, and the like), which can be queried with a non-textual query which is based on an image or portion thereof, such as a real-valued or binary representation that is based on features extracted from the image. Such multimedia objects can be in any suitable format, such as PDF, Word, HTML, XML, JPEG, GIF, JBIG, BMP, TIFF or other common file format used for images and/or text. However, the exemplary embodiment can be easily adapted for other types of media and more than two media types.

The multimedia objects may be stored in information sources or digital libraries which are generally referred to herein as a database. As will be appreciated, a database may be distributed over several memory storage devices.

In various aspects, a data fusion method for multimedia information retrieval is disclosed which facilitates retrieval of multimedia objects. The exemplary method is informed by the observation that different types of media do not play symmetric roles and accommodates the inherent asymmetry between them when combining them. The exemplary methods can significantly outperform existing linear combination methods and can also be computationally very cost efficient.

Figure 1:
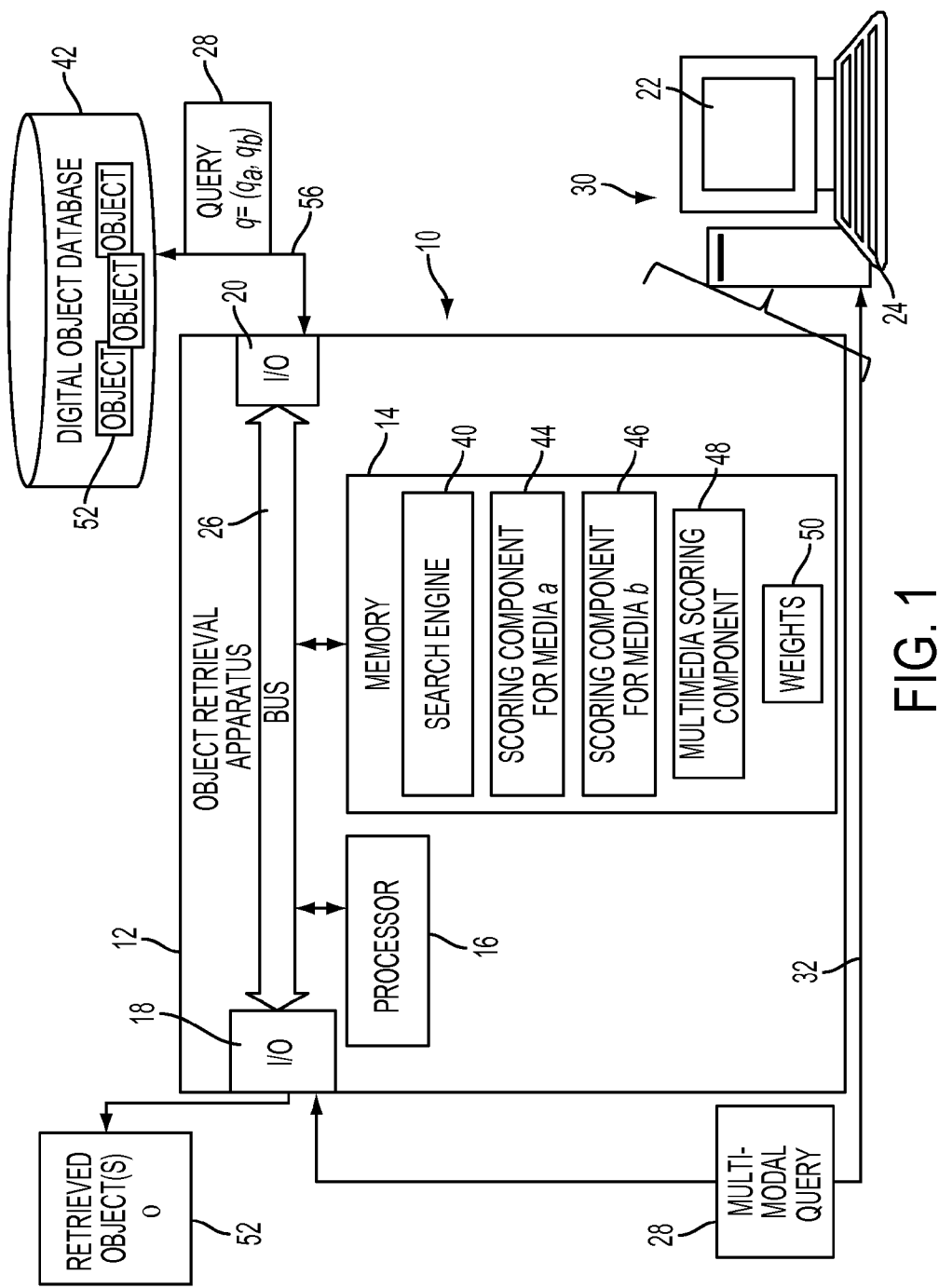
FIG. 1 is a functional block diagram of a system for multimedia information retrieval.

FIG. 1 illustrates a computer-implemented system 10 for multimedia information retrieval. The system 10 includes an object retrieval apparatus 12, such as a computer, which includes memory 14, a processor 16 in communication with the memory 14, and one or more input/output (I/O) components 18, 20 for communicating with external devices. The I/O component 18, for example, may communicate with one or more of a display device 22, such as a screen, for displaying information to users, and a user input device, for communicating user input information and command selections to the processor 16, such as a keyboard 24 or touch or writable screen, for inputting text, and/or a cursor control device, such as mouse, trackball, or the like. The various components of the apparatus 12 communicate via a data/control bus 26.

A multimedia query 28 is input to the apparatus 12 via one of the inputs 18 and is temporarily stored in memory 14. In particular, the query 28 may include first and second components corresponding to first and second media types. For example, an input query 28 may include a text component which includes one or more keyword(s) or a text document, and a visual component which includes one or more images or representations generated therefrom. The input query 28 may have been selected by a user, e.g., using a graphical user interface (GUI) 30, which in the illustrated embodiment includes keyboard 24 and display screen 22. The GUI may be linked to the apparatus 12 by a wired or wireless link 32, such as a cable, local area network, or wide area network, such as the Internet.

The apparatus 12 includes various software components stored in memory 14, for performing the exemplary method, which are executed by the processor 16. These include a search engine 40 for formulating the query into a format which can be used to query a digital object database 42, comparison components 44, 46 for computing a measure of comparison between objects in the database and the query for each of the media types, based on a respective part of the query, and a multimedia scoring component 48 which scores objects in the database based on the scores for each of the media types and optionally one or more stored weights 50. The system outputs information based on the computed scores, such as one or more retrieved objects 52 having the highest scores.

The database 42 (which can include two or more databases) includes a collection of digital objects. Although some of the objects in the collection may be mono-modal (e.g., solely text or solely images), at least some of the objects 52 in the collection are multi-modal, i.e., multimedia objects having, in the present example, both text and image content. The database 42 may be located on any suitable non-transitory memory storage device, which may be remote from or local to the apparatus 12. For example, the database 42 may be accessed from one of the I/O components 20 via a wired or wireless link 56, such as the Internet.

The memory 14 may represent any type of non-transitory computer readable medium, such as random access memory (RAM), read only memory (ROM), magnetic disk or tape, optical disk, flash memory, or holographic memory. In one embodiment, the memory 14 comprises a combination of random access memory and read only memory. In some embodiments, the processor 16 and memory 14 may be combined in a single chip. The network interface 20 allows the computer apparatus 12 to communicate with other devices via a computer network, such as a local area network (LAN) or wide area network (WAN), or the internet, and may comprise a modulator/demodulator (MODEM).

Exemplary processor 16 controls the overall operation of the apparatus 12 by execution of processing instructions which may be stored in memory 14 connected to the processor 16. The processor 16 also executes instructions stored in memory 14 for performing the method outlined in FIG. 2. The digital processor 16 can be variously embodied, such as by a single-core processor, a dual-core processor (or more generally by a multiple-core processor), a digital processor and cooperating math coprocessor, a digital controller, or the like.

The apparatus 12 may be a PC, such as a desktop, a laptop, palmtop computer, portable digital assistant (PDA), server computer, cellular telephone, pager, combination thereof, or any other computing device(s) capable of executing instructions for performing the exemplary method.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
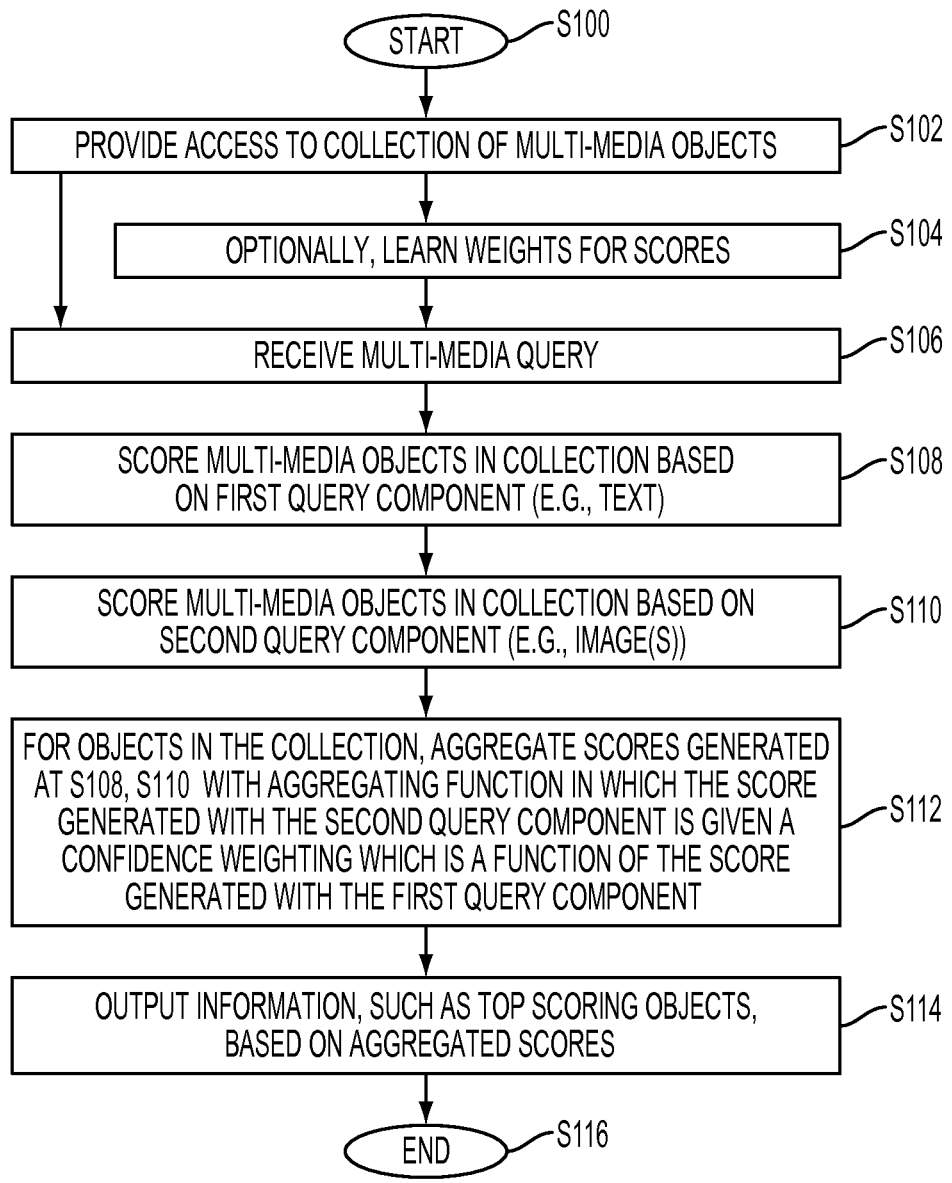
FIG. 2 is a flowchart illustrating a method for multimedia information retrieval.

FIG. 2 illustrates a method which can be performed with the exemplary system shown in FIG. 1. The method begins at S100.

At S102 access is provided to a collection of multimedia objects 52.

At S104, weights 50 may be provided to be used in scoring objects 52 in the collection.

At S106, a multimedia query 28 is received.

At S108, the collection is queried with a first component of the multimedia query 28 to generate comparison measures (e.g., similarity or distance-based scores or rankings) between the query and database objects for a first media type (e.g., text). These computed comparison measures are all referred to herein simply as "scores." This step may involve a text-based search. The top K most similar objects may be retrieved where K can be, for example, 100, 1000, 10,000, or more, and can be up to one million. In practice, on large datasets, such as Wikipedia, values of K higher than 1000 or more can yield improved results.

At S110, the collection 42 (or at least the K most highly scoring objects of the collection identified at S108) is queried with a second component of the multimedia query 28 to generate comparison measures ("scores", e.g., similarity or distance-based scores or rankings) between the query and database objects for a second media type (e.g., visual). This step may involve an image-based search.

At S112, a multimedia score is computed for each of the objects in the collection (or at least for the K highest scoring objects identified at S108). The multimedia score is computed for each of these objects based on the first and second scores generated at S108, S110. The multimedia score may be computed using an aggregating function, as described in greater detail below. One feature of this aggregating function is that a respective confidence weighting is applied to the scores of each of the media types. For scores for the first media type generated at S108, a first confidence weighting is applied which is independent of the respective score between the query and database object for the second media type generated at S110. For scores for the second media type, a second confidence weighting is applied to the score generated at S110 which is dependent on the respective score between the query and database object for the first media type generated at S108. This accounts, at least in part, for the asymmetry between the two types of media. The confidence-weighted scores for the first and second media types are optionally normalized with a normalizing function to generate values which fall within a predetermined range, such as between 0 and 1 before aggregating them with the aggregating function. The aggregating function may also apply the weights 50 to the confidence-weighted, normalized scores. The aggregating function outputs an aggregated score for each object in the collection (or at least for the subset of objects identified at S108) with respect to the multimedia query. A similarity profile which includes the aggregated scores or score-based ranking for at least a subset of the objects in the collection can be generated from the aggregated scores.

At S114, information is output based on the aggregated scores generated at S112. The information output may be a set of the top-scoring objects 52. Alternatively, the information output may be based on these objects. For example, the top-scoring objects may be used as the basis for another query and the objects from the collection (or a different collection) retrieved in that further query may output. Or, annotations may be output for a query object based on the text component of the top-scoring objects, or the like.

The method ends at S116.

The method illustrated in FIG. 2 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the exemplary method.

As will be appreciated, the steps of the method need not all proceed in the order illustrated and fewer, more, or different steps may be performed.

Aspects of the system and method will now be described in greater detail.

Late Fusion Techniques

Existing late fusion techniques can be described as follows: A media type in can be text (t) or image (v), for example. There are various methods that compute a score, such as a similarity measure, between a query q, given by the user and the objects o of a collection. Let $s_m(q,o)$ denote the similarity measure (score) between the query q and an object o according to the media type m. These scores allow the system to rank all the objects with respect to the query and to output a top list of such objects that is expected to be relevant to the user.

Assuming that a user has a multimedia information need which is expressed by a multimedia query which could include text and images which are semantically linked. In that case, a multimedia retrieval engine may attempt to combine two types of information that are provided by similarity scores $s_t$ and $s_v$. This approach in data fusion is called late fusion. The search engine may adopt a weighted mean average operator that leads to a combined score denoted $s_{LF}$ of general form:

$$s_{LF}(q,o) = \alpha_t s_t(q,o) + \alpha_v s_v(q,o) \qquad (1)$$

where the $\alpha_m$ are positive weights which sum to 1.

More formally, late fusion techniques can be expressed as:

$$s_{LF}(q,o) = \alpha_a N(s_a(q,o)) + \alpha_b N(s_b(q,o)) \qquad (2)$$

where $s_a(q,o)$ and $s_b(q,o)$ are scores between the query q and the object using respectively the a or the b media type (in the exemplary case, using textual and visual similarity measures, respectively) and N is a normalization operator that transforms each score to a normalized value between 0 and 1.

In others words, such methods normalize the scores of the media independently of each other and combine them with a mean average operator.

The Exemplary Fusion Method

In the exemplary method of fusing scores, since different media are semantically expressed at several levels, the scores are not combined purely linearly, as suggested by Equations 1 and 2. Rather, the present method takes advantage of the underlying complementary nature of the media types in aggregating the similarity scores (which can be obtained in the same way as for the late fusion method).

Assume that a collection of multimedia objects includes two media types a and b. It is assumed that one media type, a for example, is better managed and analyzed than the other one, from a semantic point of view. For illustration purposes, it is assumed that a is text media and b is visual media (images).

Consider a multimedia information need expressed by a multimedia query $q=(q_a,q_b)$, where $q_a$ may represent the textual part of the query and $q_b$ visual part of the query. Let $s_a(q,o)$ denote the similarity score of $q_a$ with respect to an object o of the collection, represented by its a part, which is given by the mono-media scoring component 44. $s_b(q,o)$ denotes the similarity score of $q_b$ with respect to the same object of the collection, represented by its b part, given by mono-media scoring component 46.

The general data fusion method employed herein can be used to express similarity scores as the output of an aggregating function A which aggregates the two scores:

$$s_{cw}(q,o) = A(N(s_a(q,o),f),N(s_b(q,o),g)) \qquad (3)$$

where $S_{cw}$ is the aggregated similarity score;

A represents an aggregating function;

a represents the first media type;

b represents the second media type;

$s_a(q,o)$ and $s_b(q,o)$ are the scores between the query q and the object o for the first and second media types, respectively;

$f$ is a function of a first comparison measure which may be at least one of $r_a(o,q)$ and $s_a(q,o)$, and optionally also a function of $\theta_a$, and can thus be represented as $f(s_a(q,o),r_a(o,q),\theta_a)$, which expresses the confidence weighting of a with respect to a;

g is a function of at least two comparison measures, the first comparison measure can be the at least one of $r_a(o,q)$ and $s_a(q,o)$ and the second comparison measure can be at least one of $s_b(q,o)$ and $r_b(o,q)$, and is optionally also a function of $\theta_b$ and can thus be represented as $g(s_a(q,o),r_a(o,q),s_b(q,o),r_b(o,q),\theta_b)$, which expresses the confidence weighting of b with respect to a;

$r_a(o,q)$ and $r_b(o,q)$ are ranks of the object o given by the respective similarity scores $s_a(q,o)$ and $s_b(q,o)$, with respect to other objects in the collection;

$\theta_a$ is a set of one or more parameters for media type a;

$\theta_b$ is a set of one or more parameters for media type b; and

N represents an optional normalizing operator that transforms each similarity score to a normalized value between 0 and 1.

More formally, Eqn. (3) can be represented as:

$$s_{cw}(q,o) = A\Big(N(s_a(q,o)\underbrace{f(s_a(q,o),r_a(o,q),\theta_a)}_{\text{confidence weighting of } a \text{ wrt } a}), \qquad (4)$$

$$N(s_b(q,o)\underbrace{g(s_a(q,o),r_a(o,q),s_b(q,o),r_b(o,q),\theta_b)}_{\text{confidence weighting of } b \text{ wrt } a})\Big)$$

$S_{cw}$ in Eqn. (3) is thus the aggregated similarity score that combines the scores $s_a(q,o)$ and $s_b(q,o)$ using a confidence weighting scheme driven by the most confident media (a in the exemplary embodiment). The aggregated similarity scores for a set of objects can then used to output the final top list of objects. In Equation (3), the similarity scores $s_a(q,o)$ and $s_b(q,o)$ can, of course be any suitable type of comparison measures between the query q and the object o using respectively the a or the b media type (in one embodiment, using textual and visual similarity measures, respectively).

Functions $f$ and $g$ encode a confidence weight for the score of an object given by a respective media. Specifically, in the sub-part $s_a(q,o)f(s_a(q,o),r_a(o,q),\theta_a)$, $f$ is a function that assigns to the previous term, $s_a(q,o)$, a confidence weight that depends on at least one of the similarity score $s_a(q,o)$ and the retrieval rank $r_a(o,q)$ and optionally a set of one or more parameters $\theta_a$. The parameter(s) $\theta_a$ can be a simple threshold on the score or on the rank associated to the media a (as in an exemplary embodiment outlined below). In the sub-part $s_b(q,o)g(s_a(q,o),r_a(o,q))$, g is a function that assigns to the previous term, $s_b(q,o)$, a weight, but in this case, the weight depends on at least one of the similarity score $s_a(q,o)$ and rank $r_a(o,q)$ of the former media a. It can be additionally dependent on at least one of the score $s_b(q,o)$ and the rank $r_b(o,q)$ for media b. The set of parameters $\theta_b$ are again optional and can be the same as $\theta_a$ or an extended set of parameters.

The component $s_b(q,o)g(s_a(q,o),r_a(o,q))$ is of particular benefit to the exemplary fusion method. It can be used to encode how much trust is placed on the score $s_b(q,o)$. In the exemplary embodiment, the trust is measured by the media a, which is considered to be more reliable in terms of the scores. As a proxy for trust, the score of the current object given by media a is used.

A is an aggregation operator that takes as inputs (at least) two similarity scores and merges them into one. In one embodiment, A can be the simple mean average operator, although more complex functions can also be used. In a mean average operator, the two terms $N(s_a(q,o)f)$ and $N(s_b(q,o)g)$ are weighted with $\alpha_a$ and $\alpha_b$, respectively, as in Eqn. (1) above, and the resulting aggregated score is a mean of the two weighted terms. In one embodiment, $\alpha_a$ and $\alpha_b$ can each be greater than 0 and less than 1, and in one embodiment, $\alpha_a \approx \alpha_b$, e.g., $\alpha_a = \alpha_b$.

In another embodiments, the aggregating function A can be a max function:

$$A(u,v) = \max(u,v),$$

where $u = \alpha_a N(s_a(q,o)f)$ and $v = \alpha_b N(s_b(q,o)g)$, a quasi-arithmetic mean:

$$A(u,v) = \left(\frac{1}{2}(u^\delta + v^\delta)\right)^{1/\delta},$$

where $\delta \neq 1$,
or a reinforced late fusion:

$$A(u,v) = u + v + \min(u,v)$$

Other aggregated functions are also contemplated. See, for example, Marcin Detyniecki, Fundamentals on Aggregation Operators, AGOP (2001), which provides a review of such operators.

The two media are assumed not to have the same capability, from a semantic and a performance point of view, for multimedia information retrieval. In the exemplary embodiment, media a is assumed to be a more confident media than media b and in the exemplary embodiment, the weight given to the score based on the latter is dependent on the score given by the former. Furthermore, in the exemplary embodiment, the media a constrains the search space for the media b. In this way, the method takes into account the asymmetry between a and b.

The exemplary embodiment is not limited to multimedia searching in text and image media. The modalities a and b can be any two facets of the same object (for example color based and texture based descriptions of the same image, or the like).

Fusion of Confidence Weighted Scores

As an example, the aggregation function A is the average mean operator. In the specific case where a and b are text and visual modalities, respectively, Equation (3) becomes:

$$s_{cw}(q,o) = \alpha_t N(s_t(q,o)f(s_t(q,o),r_t(o,q),\theta_t)) + \alpha_i N(s_i(q,o)g(s_t(q,o),r_t(o,q),s_i(q,o),r_i(o,q),\theta_i)) \quad (4)$$

where t and i refer respectively to the textual and visual modalities. As will be appreciated, these could be generalized by replacing them with a and b, respectively, as in Eqn. (3). As multiplying all scores with a constant will not change the ranking, let $\alpha_t = \alpha$ and $\alpha_i = 1 - \alpha$, with $\alpha$ having a value between 0 and 1.

In one embodiment, $\alpha > 0$, e.g., at least 0.01, or at least 0.1. In another embodiment, $\alpha < 1$, e.g., up to 0.99 or up to 0.9. In one specific embodiment $\alpha = 0.5 \pm 0.05$, i.e., both parts are equally or at least approximately equally weighted. A suitable value of $\alpha$ can be learned experimentally, by manually observing the results obtained by the system on a collection of documents of the type to be searched. Different values of $\alpha$ could thus be used with different datasets/queries. However, in practice, the same value of $\alpha$ can be selected and can yield good results (near optimal performance) for different corpora, such as an equal weighting ($\alpha = 0.5$).

For functions $f$ and g, various types of function, such as step functions, are contemplated. As examples, the following functions are mentioned.

1. Step Function

A simple rank-based filter, such the step function may be used. For example:

$$f(r_t(o,q)) = g(r_t(o,q)) = \begin{cases} 1 & \text{if } r_t(o,q) \leq K \\ 0 & \text{otherwise} \end{cases} \quad (5)$$

Here the ranking $r_t(o,q)$ is an integer with the highest scoring object being given a rank of 1, the next one, a rank of 2, and so forth. This step function has the following effect. It considers only the top K ranked objects retrieved using the textual modality $r_t(o,q) \leq K$ at S108 and then averages the textual and visual scores by the weighted late fusion strategy. In another embodiment, a threshold on the textual scores $s_t(q,o) < T_t$ may be used to select the top retrieved documents. In this case, a variable number of documents is contemplated. A combination of these approaches may be considered, for example, a maximum of K documents with $s_t(q,o) < T_t$.

In other embodiments, more than two steps may be used, such as three or four steps, each with a respective, different set of K values.

2. Log Function

In this embodiment, a smoothed version of a step function is used. Here, instead of giving the same weights to each retrieved document with the first modality, their ranks are also considered. The following smoothed function may be used:

$$g(r_t(o,q)) = \begin{cases} \dfrac{\log(K - r_t(o,q) + 1)}{\log(K)} & \text{if } r_t(o,q) < K \\ 0 & \text{otherwise} \end{cases} \quad (6)$$

This gives a real value to g for the top K objects, rather than the quantized value of 1 in the case of the step function. For the smoothed function embodiment, the function $f$ is the same as in Equation (5), meaning the scores are simply filtered.

3. Fraction Function

In another embodiment, a fraction function may be used where the weights decrease more quickly:

$$g(r_t(o, q)) = \begin{cases} \frac{x(K+1)}{(K+r_t(o, q))} - y & \text{if } r_t(o, q) < K \\ 0 & \text{otherwise} \end{cases} \quad (7)$$

where x is a parameter which can be tuned and can be at least 1, such as 1 or 2 and y is a parameter which can be tuned which is at least 0 and can be, for example, 0, 1 or 2.

For the fraction version of function g, the function $f$ is the same as in Equation (5).

4. Text Score-based Function

In another embodiment, a text score based function may be used:

$$g(r_t(o, q)) = \begin{cases} s_t(o, q)^\delta & \text{if } r_t(o, q) < K \\ 0 & \text{otherwise} \end{cases} \quad (8)$$

where δ is a parameter greater than 0. $f$ is kept the same as in Equation (5).

Figure 3:
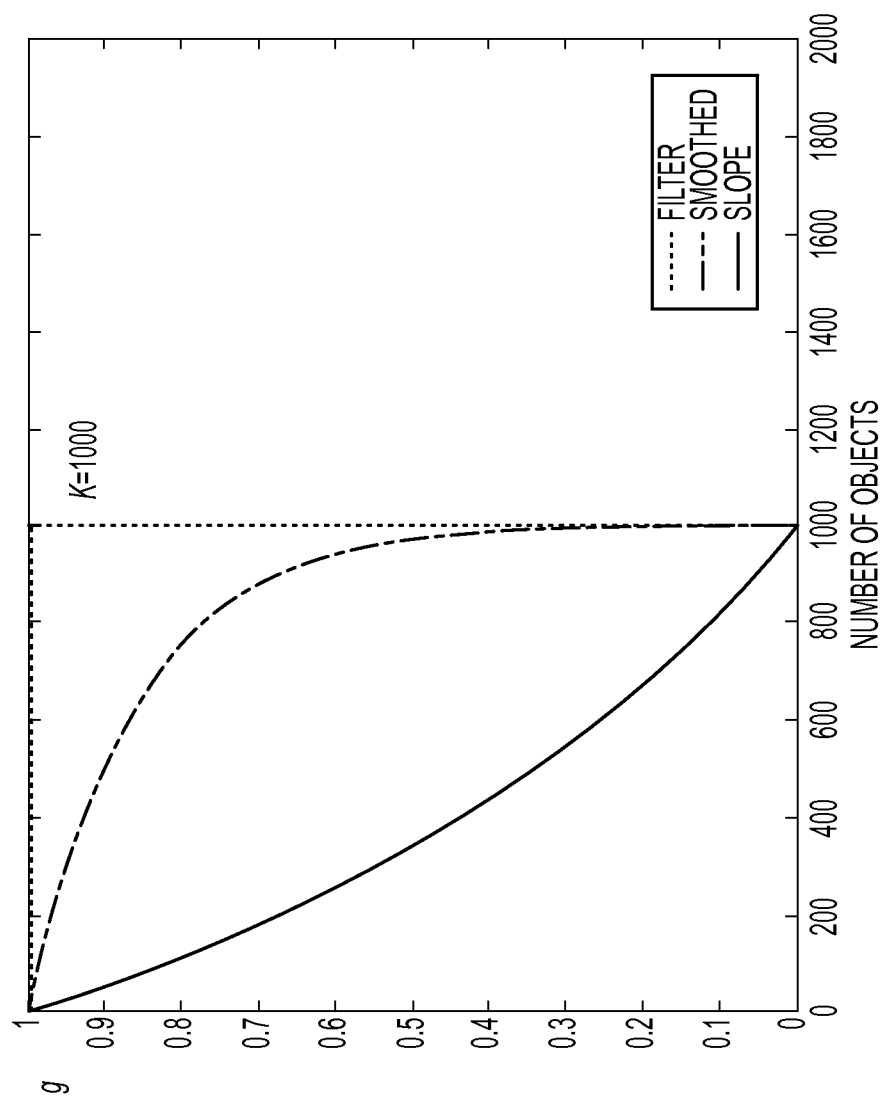
FIG. 3 is a graph illustrating three alternative step functions: Step, Log, and Fraction, which may be used in aspects of the exemplary embodiment.

FIG. 3 shows a plot which illustrates the effect of choosing one of three functions (Step, Log, and Fraction) on the value of g, where K is 1000 and x is 2. For all the functions, the value is 0 when the rank is greater than K, but for rank values less than K, the three functions perform differently.

As will be appreciated, more complex weighed functions can be designed that may also take into account the image ranks and/or the textual and/or visual scores. It has been found, however, that the exemplary, fairly simple functions can be effective for retrieval tasks.

The exemplary method is also highly scalable, which is an advantage when working with large collections. Good performance can be achieved, for example, by computing visual similarity scores only on the set of elements retrieved by the text search and not on the full dataset. An existing text-based retrieval system 44 (such as that employed by Google, Yahoo, or Bing search engines) can thus be employed. Such systems are able to handle several million or billion documents and retrieve relevant documents based on textual queries in few seconds. In an exemplary embodiment, in the first step only the text information is used to retrieve documents and hence visual similarity scores need only to be computed between the visual part of the query and visual part of these retrieved objects.

Similarity Scores

The exemplary method is not limited to any particular method for representing image and textual portions of the query and database objects and for computing similarity or other comparison measure between them. As examples, the following methods are proposed.

1. Images/Visual Portion of the Query

The image portions of the database objects and of the query can be represented by any suitable representation (sometimes called an image signature) which allows a comparison computation to be made. For example, any of the methods disclosed in the following references can be used for generating an image representation based on content: U.S. Pub. Nos. 20070005356, 20070258648, 20080069456, 20090144033, 20100092084, 20100098343, 20100189354; Gabriela Csurka, et al., "Visual Categorization with Bags of Keypoints," ECCV Workshop on Statistical Learning in Computer Vision, 2004; Florent Perronnin, et al., "Fisher kernels on visual vocabularies for image categorization," in CVPR, 2007; Florent Perronnin, et al., "Large-scale image categorization with explicit data embedding," in CVPR 2010; and Florent Perronnin, et al., "Large-scale image retrieval with compressed fisher vectors," in CVPR 2010. These references provide methods for describing an image with an image representation based on extracted features. The references also describe methods for computing a score between two images (here a visual part of a query and a visual part of a database object), based on the respective representations.

Fisher vectors and Fisher Kernel representations are exemplary of types of high level representation which can be used herein. In another embodiment, a Bag-of-Visual words (BOV) representation may be used, as described in above mentioned U.S. Pub. Nos. 20080069456 and 20070005356. In the BOV based approach, the image is first characterized by a histogram of visual word counts. The visual vocabulary is built automatically from a training set of images.

In one exemplary embodiment, a version of the Fisher Vector described in the two CVPR 2010 references is used. The Fisher Vector can be understood as an extension of the bag-of-visual-words (BOV) representation. Instead of characterizing an image with the number of occurrences of each visual word, it characterizes the image with the gradient vector derived from a generative probabilistic model. The gradient of the log-likelihood describes the contribution of the parameters to the generation process.

The low level image descriptors which are extracted from patches of the image in these methods are typically quantitative values that summarize or characterize aspects of the respective patch, such as spatial frequency content, an average intensity, color characteristics (in the case of color images), gradient values, and/or other characteristic values. The patches can be obtained by image segmentation, by applying specific interest point detectors, by considering a regular grid, or by simply random sampling of image patches. In some embodiments, at least about fifty low level image descriptors are extracted from each patch and there may be at least ten such patches. However, the number of image descriptors that can be extracted is not limited to any particular number or type of image descriptors. For example, a thousand or a million low level image descriptors could be extracted depending on computational capabilities. In the exemplary embodiment, the low level image descriptors include local (e.g., pixel) color statistics, and/or texture. For color statistics, local RGB statistics (e.g., mean and standard deviation) may be computed. For texture, gradient orientations (representing a change in color) may be computed for each patch as a histogram (SIFT-like features). In the exemplary embodiment two (or more) types of low level image descriptors, such as color and texture, are separately extracted and the high level representation is based on a combination of two Fisher Vectors, one for each feature type. In other embodiments, Scale Invariant Feature Transform (SIFT) descriptors (as described by Lowe, in "Object Recognition From Local Scale-Invariant Features", ICCV (International Conference on Computer Vision), 1999, are computed on each patch. SIFT descriptors are multi-image representations of an image neighborhood, such as Gaussian derivatives computed at, for example, eight orientation planes over a four-by-four grid of spatial locations, giving a 128-dimensional vector (that is, 128 image descriptors per features vector in these embodiments). Other descriptor or feature extraction algorithms may be employed to extract low level image descriptors from the patches. Examples of some other suitable image descriptors are set forth by K. Mikolajczyk and C. Schmid, in "A Performance Evaluation Of Local Descriptors", Proceedings of the Conference on Computer Vision and Pattern Recognition (CVPR), Madison, Wis., USA, June 2003, which is incorporated in its entirety by reference.

In an illustrative approach, an image is characterized with a gradient vector derived from a Gaussian mixture model (GMM), which approximates the distribution of the low-level features extracted from images. If the dimension of the low level feature space is high (as is the case in the example embodiment) the dimensionality of these features can be reduced using component analysis (PCA). In some suitable embodiments, 64 or 128 mixture components are employed, with two visual vocabularies combined (one defined over texture features, and the other over color features), in both of which, the low level features are extracted on a regular grid at different scales. Using diagonal Gaussians and considering only the mean and variance parameters, the dimensionality of the Fisher vector can be 64 or 128*(50+50). The resulting two vectors are concatenated to obtain a single image signature of dimension 12800 or 25600.

Prior to computing similarity, the Fisher vectors representing the images can be normalized with a power normalization to make the distribution of features in a given dimension less peaky around 0. Then, these vectors can be L2 normalized to discard image-independent (i.e. background) information (for further details on both types of normalization, see F. Perronnin, J. Sanchez, and Y. Liu, Large-scale image categorization with explicit data embedding, in CVPR 2010).

The similarity between two image feature vectors representing the query object image component and a database object image component can then be defined as their negative L1 or L2 distance. In the exemplary embodiment, a simple dot product similarity between Fisher vectors can be used as the similarity measure between the query image and a database image. For further details on an exemplary implementation, see Stéphane Clinchant, Gabriela Csurka, Julien Ah-Pine, Guillaume Jacquet, Florent Perronnin, Jorge Sanchez, and Keyvan Minoukadeh, "XRCE's Participation in Wikipedia Retrieval, Medical Image Modality Classification and Ad-hoc Retrieval Tasks of ImageCLEF 2010", In Proc. CLEF (Notebook Papers/LABs/Workshops) 2010 (hereinafter, Clinchant 2010).

This is merely an illustrative example, and other monomodality visual similarity metrics $s_i(q,o)$ can be employed, such as computation of hash values with hash functions (see, e.g., U.S. Pub. No. 20100185615).

In one embodiment, the text-based representations of the objects in the collection may be precomputed and stored in memory 14.

2. Text

In some embodiments, a representation of the textual component of each of the database objects can be computed, e.g., based on frequencies of word counts. Similarity can then be determined by comparing a similar frequency-based representation for the textual part of the query (or simply, the words used). In one embodiment, the textual component of the database object is first preprocessed by tokenization, lemmatization, and standard stopword removal (to remove very frequent words). A bag-of-words representation can then be built of word frequencies of some or all of the remaining, optionally lemmatized, words. However, in some cases, lemmatization may lead to a loss of information. Therefore, in one embodiment, a lemmatized version of the document is concatenated with the original document.

For computing similarity between the query and the database object textual part, any suitable information retrieval models may be employed. For example, a standard language model or an information-based model employing a log-logistic distribution can be used, as described in Stéphane Clinchant and Eric Gaussier, "Information-based models for ad hoc ir," in SIGIR '10: Proc. 33rd Int'l ACM SIGIR Conf. on Research and Development in Information Retrieval, pages 234-241 (ACM New York 2010). To take into account that documents of different lengths are being compared, most information retrieval models do not rely directly on the raw number of occurrences of words in documents, but rather on normalized versions thereof. Language models, for example, use the relative frequency of words in the document to that of the collection. One suitable approach to generating a textual representation is the language model approach to information retrieval on the preprocessed texts. See, e.g., Ponte, et al., "A language modelling approach to information retrieval", in SIGIR, pp. 275-81 (ACM 1998). The resulting language model defines, for each document, a probability distribution over the lemmatized words. In the case of structured documents, in which text is distributed among various fields, which may be denoted by XML tags or other field information, the field information can also be used in the language model.

In one embodiment, a suitable similarity measure between two documents q and o (the textual part of the query and the textual part of an object) can be computed as the cross-entropy: $s_t(q,o) = \Sigma_w p(w|q) \log p(w|o)$, where $p(w|q)$ is the probability distribution over words w in the query and $p(w|o)$ is the probability distribution over words w in the database object. For further details of this method, see application Ser. No. 12/872,105 and Clinchant 2010, and the references cited therein. Again, this is merely an illustrative example, and other monomodality text similarity metrics $s_t(q,o)$ can be employed.

Other methods for computing textual similarity include the use of hash functions and word spotting (for handwritten text documents).

In one embodiment, the text-based representations of the objects in the collection may be precomputed and stored in memory 14.

As noted above, the text-based scores between the query and database objects can be computed for all objects in a collection, with visual-based scores being performed for only the top K objects.

Applications

There are various applications for the exemplary system and method. In one application, the method and system are used in a multimedia retrieval and content management system. The method can provide such a system with a common, multimedia way of representing, for example, text, images, or other media in order to exploit links between all these modalities. There are likely to be increased opportunities for this hybrid exploitation as multimedia objects become more common.

The exemplary system and method may be used in hybrid retrieval systems where multimedia documents, images and/or text, can be accessed through textual, visual, or hybrid queries. For example the system and method can be used in Web-search, Medical document retrieval, and/or in document management systems.

The exemplary system and method may also be used for multimedia categorization and clustering. Here, the system enables categorizing of texts, images, and/or hybrid objects in a common taxonomy, or separate taxonomies, taking into account the interrelationships and inter-dependencies between the different facets of a multimedia object.

The system and method may also find application in content creation and assisted document generation (e.g., automatic illustration, image and multimodal document auto-annotation, multimodal summarization, and the like).

As an illustrative example of one use of the exemplary method, an automatic or semi-automatic image annotation system may employ the retrieval system 10 to identify already-annotated images that are similar to a new (i.e., query) image which may have a more limited text content, and the annotation system then annotates the new image based on the annotations of the identified similar already-annotated images.

The exemplary system and method are particularly suited to multi-modality searching where different media, for example texts and images, tend to be expressed at different semantic levels. As a result, one media type usually outperforms the other one in queries, even though both types of media are complementary and their aggregation can improve the performance. The exemplary method is able to reweight the result of one media query part by the confidence another media type gives to that object.

Without intending to limit the scope of the exemplary embodiment, the following examples demonstrate the application of the system and method.

EXAMPLES

The exemplary system and method have been tested on different image datasets with several aggregation and confidence weighting functions and the results compared.

Datasets

Four datasets were used. These datasets have been manually evaluated, as part of the ImageCLEF competition, to identify similar images for multimedia queries in order to be able to assess the retrieval performance of a candidate retrieval system on a multimedia collection. The datasets are:

1. The IAPR TC-12 photographic collection: This consists of 20,000 natural still images taken in different locations around the world and comprising an assorted cross-section of still natural images. This dataset includes pictures of different sports and actions, photographs of people, animals, cities, landscapes, and many other aspects of contemporary life. Each image is associated with an alphanumeric caption stored in a semi-structured format. These captions include the title of the image, the location at which the photograph was taken, and a semantic description of the contents of the image (as determined by the photographer).

2. BELGA: The Belga News Collection contains 498,920 images from the Belga News Agency, which is an image search engine for news photographs. Each photograph has a maximum of 512 pixels in either width or height, and is accompanied by a caption composed of English text of up to a few sentences in length. The caption may contain, for example, the date and place where image was captured. From this collection, only the subset of 73,240 images for which relevance judgments were provided was used.

3. WIKI: The Wikipedia collection consists of 237,434 images and associated user-supplied annotations in English, German and/or French. In addition, the collection contains the original Wikipedia pages in wikitext format from which the images were extracted.

4. MED: The medical image collection consists of 77,477 medical images of different modalities, such as CT, MR, X-Ray, PET microscopic images but also includes graphical plots and photos. A set of 16 textual queries with 2-3 sample images for each query were provided. The queries were classified into textual, mixed and semantic queries, based on the methods that are expected to yield the best results. However, in the examples below, the queries were all handled the same way.

Image and Text Representations

Image and textual representations of database objects, and similarity measures were computed using Fisher vector-based or BOV representations for images and language model based representations for text, according to the method outlined in Clinchant 2010.

As image representations, two types were evaluated, BOV image representations, where an image is described by a histogram of quantized local features and the Fisher Vector that can be seen as an extension of it, described above. Both of them are based on an intermediate representation, the visual vocabulary built in the low level feature space. Two types of low level features, the SIFT-like Orientation Histograms (ORH) and local RGB statistics (COL), were used and an independent visual vocabulary built for each of them. The visual vocabulary was modeled by a Gaussian mixture model (GMM), where each Gaussian corresponds to a visual word. In the BOV representation, the low-level descriptors are transformed into high level N-dimensional descriptors (N is the number of Gaussians) by cumulating, for each Gaussian the probabilities of being generated by the given Gaussian over all low level descriptors. The Fisher Vector extends the BOV representation by going beyond counting (0-order statistics) and by encoding statistics (up to the second order) about the distribution of local descriptors assigned to each visual word. It characterizes a sample by its deviation from the GMM distribution. To compare two images I and J, a natural kernel on these gradients is the Fisher Kernel K(I,J) which can be rewritten as a dot-product between normalized vectors which is referred to as the Fisher Vector (FV) of the image I. Square-rooting and L-2 normalization on the BOV and FV are performed and also a spatial pyramid can be built (S. Lazebnik, C. Schmid, and J. Ponce. Beyond bags of features: Spatial pyramid matching for recognizing natural scene categories. In CVPR, 2006). To do the latter, the image is repeatedly subdivided into 1, 3 and 4 regions considering the FV of the whole image (1×1), the concatenation of 3 FV extracted for the top, middle and bottom regions (1×3) and finally concatenation of four FV one for each quadrants (2×2). The dot product (linear kernel) is used to compute the similarity between the concatenation of all FVs for ORH and COL. It is not necessary to concatenate all these vectors explicitly as:

$$<[u,v];[u',v']> = <u,u'> + <v,v'>$$

Standard preprocessing techniques were applied to the textual documents. After stopword removal, words were lemmatized and the collection of documents indexed with Lemur. Standard language models and information models for text retrieval were evaluated. In language models, queries and documents are represented by multinomial distributions. Those distributions are estimated by maximizing the likelihood. Then, documents distributions are smoothed with a Dirichlet Prior and the cross-entropy can be used to rank documents according to: $s_t(q,o) = \Sigma_w p(w|q) \log p(w|o)$, as described above. In information models, the more a word deviates in a document from its average behavior in the collection, the more likely it is 'significant' for this particular document. This can be easily captured in terms of information: For example, if a word has a low probability of occurrence in a document, according to the distribution collection, then the amount of information it conveys is more important if it appears. An information model is specified in three steps: the normalization of term frequencies, the choice of a probability distribution to models these frequencies on the corpora (here a log-logistic distribution) and the ranking function which is similar to a mean information. As there is little difference between the performances of different types of text model, language models were used for the IAPR dataset and information models for BELGA, WIKI and MED datasets. Additional experiments when the text model is changed are not included here.

The actual methods used for computing the text and visual scores are not critical, however, since the same similarity scores are used in each case.

For the aggregation function, the average mean operator was used, as outlined in Equation 4, above.

Four confidence weighting functions were used: Step (Eqn. 5), Log (Eqn. 6), Fraction (Eqn. 7, x=1, y=0), and Text Score (Eqn. 8), as described above.

Figure 4:
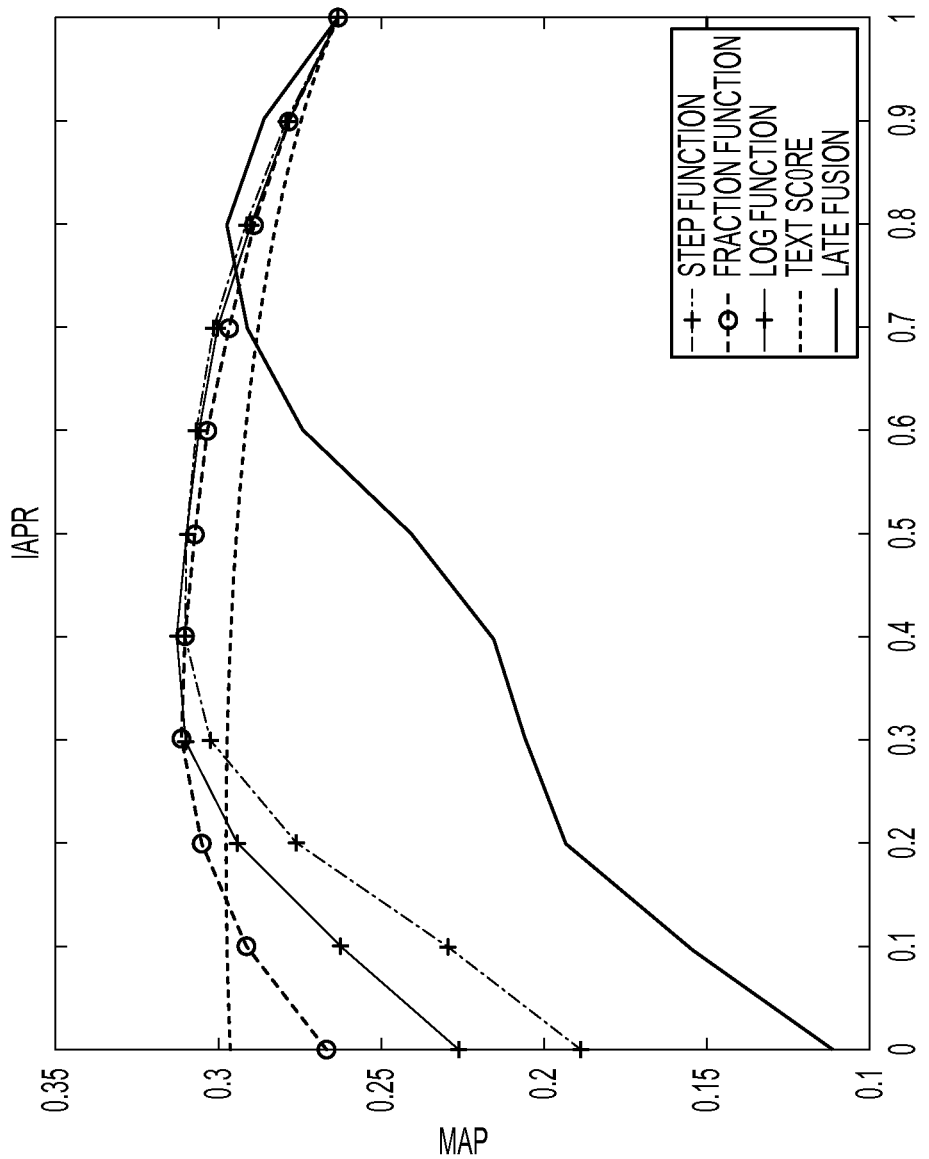
FIG. 4 is a plot of mean average precision (MAP) vs. weight α for the exemplary method using four functions Step, Log, Fraction, and Text score, and for a comparison baseline, late fusion method, in a test using the International Association of Pattern Recognition APR TC-12 (IAPR) dataset.
Figure 5:
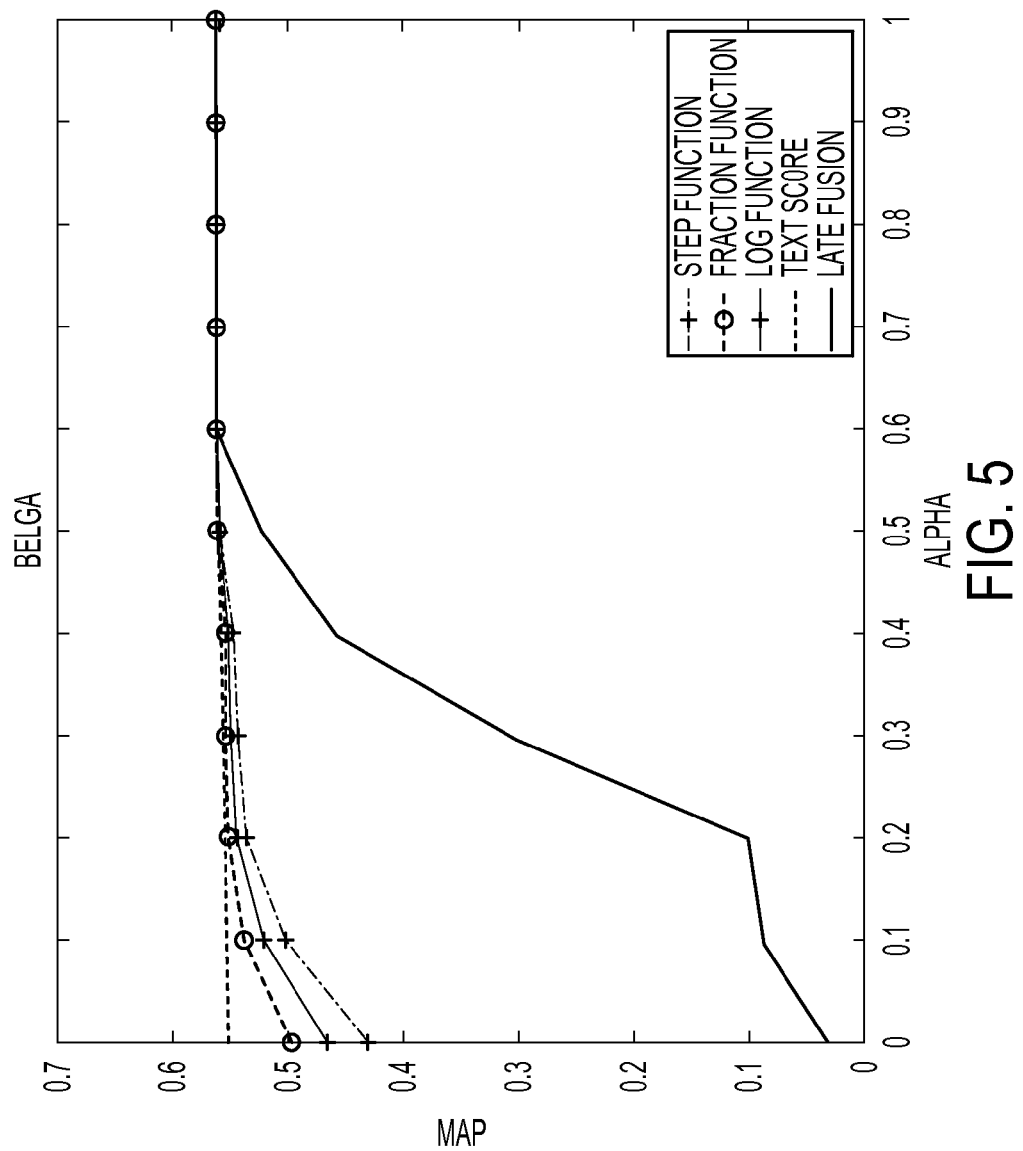
FIG. 5 is a plot of precision (MAP) vs. weight α for the exemplary method using the four step functions and for the comparison late fusion method in a test of the method on the Belga News Collection (BELGA) dataset.
Figure 6:
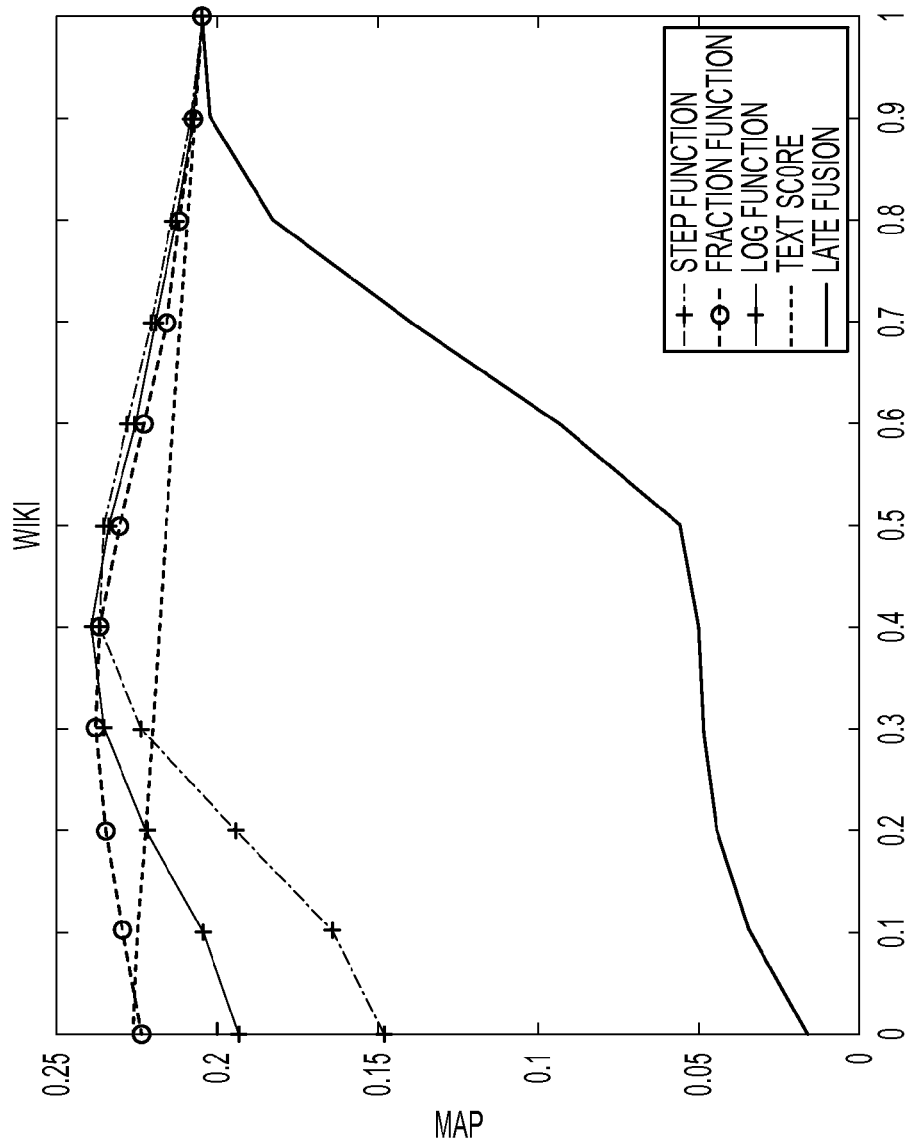
FIG. 6 is a plot of precision (MAP) vs. weight α for the exemplary method using the four step functions and comparison late fusion method in a test on the Wikipedia (WIKI) dataset.
Figure 7:
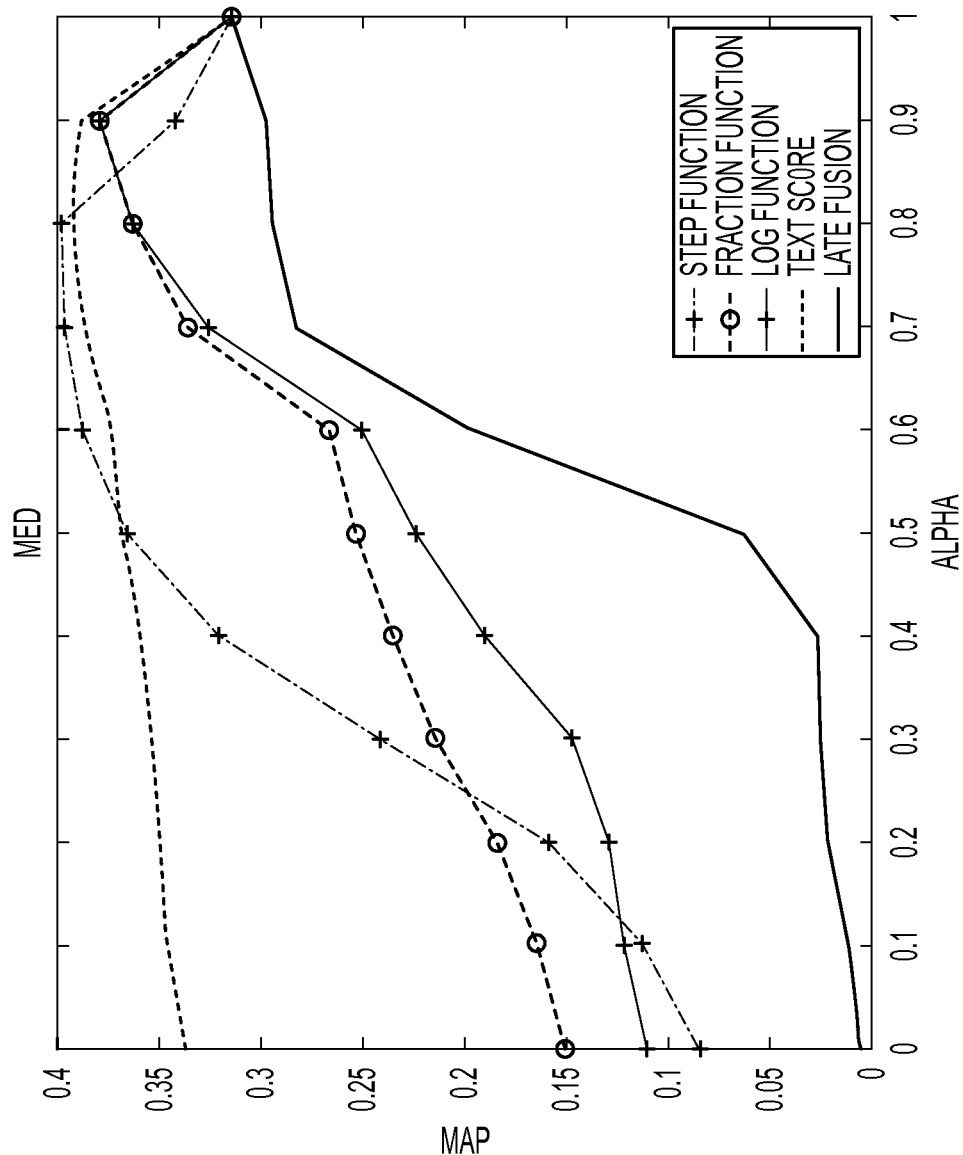
FIG. 7 is a plot of precision (MAP) vs. weight α for the exemplary method using the four step functions and comparison late fusion method in a test on the Medical Image Collection (MED) dataset.

FIG. 4 shows the performance of the system with these four weighting functions and results for a comparative method (a baseline, late fusion method, without the exemplary weighting function) on the IAPR dataset, by varying the $\alpha$ parameter. Fisher kernels were used for the image representations. The performances are computed with the mean average precision (MAP). MAP is the mean of the average precision for several tests. FIGS. 5, 6, and 7 show corresponding results for the BELGA, WIKI, and MED datasets.

On the IAPR dataset, the performance reached by exemplary methods are better than the baseline (late fusion) method and are generally less sensitive to selection of $\alpha$ than the baseline method. One reason for the relatively good late fusion performance on this corpus may be that the visual similarity scores are better than in other datasets (about 12% MAP), whereas for text it is about 25%. There is thus a smaller difference of performance for the two media types in this dataset, and the full advantage of the exemplary method is not realized. Both methods, late fusion and confidence-weighted fusion, are able to get better performance than any single media alone.

For the BELGA dataset (FIG. 5), visual mono-media retrieval methods reach a much lower performance: around 5% MAP, whereas for text it is about 25%. This is a more typical case that the exemplary method is able to address, where image similarities have much lower performances than textual ones. The plots show that the confidence weighted methods are more robust to the choice of $\alpha$.

For the Wikipedia corpus (FIG. 6), a similar behavior to that in the BELGA corpus is observed. Visual mono-media retrieval methods achieve poor performance (<5% MAP) and thus the exemplary methods are able to achieve a significant improvement over the baseline, while being relatively robust to the choice of $\alpha$.

For the MED corpus (FIG. 7), the exemplary functions all performed better than the late fusion method.

A benefit of the exemplary confidence weighting scheme is clearly seen by looking at the performance when $\alpha=0$. After this weighed filtering, the visual score-based retrieval is significantly improved. Moreover, while the weighed filtering score is significantly better than pure image based retrieval, its combination with text scores allows further improvement of the retrieval performance.

Another advantage of the exemplary method which can be seen from the results is that it is not necessary to learn a suitable value of $\alpha$, as an equal weighting ($\alpha=0.5$) is, in general, a good strategy (for the MED dataset, a somewhat higher value of $\alpha$ may be appropriate). Having a useful, single value of $\alpha$ which is substantially dataset independent is beneficial since a priori information for a dataset may not be available. Or, as in an online search, the query can be variably more visual or more textual, so it may not be feasible to learn the best value of $\alpha$.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for multimedia information retrieval comprising:
    querying a multimedia collection with a first component of a multimedia query to generate first comparison measures between the first query component and respective objects in the collection for a first media type;
    querying at least a part of the multimedia collection with a second component of the multimedia query to generate second comparison measures between the second query component and respective objects in the collection for a second media type;
    computing an aggregated score for each of a set of objects in the collection based on the first comparison measure and the second comparison measure for the object, the computing comprising applying an aggregating function to the first and second comparison measures in which a first confidence weighting is applied to the first comparison measure and a second confidence weighting is applied to the second comparison measure, the first confidence weighting is independent of the second comparison measure and the second confidence weighting is dependent on the first comparison measure; and
    outputting information based on the aggregated scores,
    wherein the aggregated score is computed using an aggregating function of general format:

$$s_{cw}(q,o)=A(N(s_a(q,o),f),N(s_b(q,o)g)) \quad (3)$$

where $S_{cw}$, is the aggregated score;
    A represents the aggregating function;
    a represents the first media type;
    b represents the second media type;
    $s_a(q,o)$ and $s_b(q,o)$ are similarity scores between the query q and the object o for the first and second media types respectively;
    $r_a(o,q)$ and $r_b(o,q)$ are rankings of the object o given by the respective similarity scores $s_a(q,o)$ and $s_b(q,o)$, with respect to other objects in the collection;
    $f$ is a function of at least one of $r_a(o,q)$ and $s_a(q,o)$ and optionally also of $\theta_a$;
    g is a function of at least one of $r_a(o,q)$ and $s_a(q,o)$ and at least one of $s_b(q,o)$ and $r_b(o,q)$ and optionally also of $\theta_b$;
    $\theta_a$ is a set of one or more parameters;
    $\theta_b$ is a set of one or more parameters; and
    N represents an optional normalizing operator,
    wherein at least one of:

$$f(r_t(o, q)) = g(r_t(o, q))$$
$$= \begin{cases} 1 & \text{if } r_t(o, q) \leq K \\ 0 & \text{otherwise;} \end{cases}$$

-continued $$f(r_t(o, q)) = g(r_t(o, q))$$
$$= \begin{cases} \frac{\log(K - r_t(o, q) + 1)}{\log(K)} & \text{if } r_t(o, q) < K \\ 0 & \text{otherwise;} \end{cases}$$

$$f(r_t(o, q)) = g(r_t(o, q))$$
$$= \begin{cases} \frac{x(K+1)}{(K + r_t(o, q))} - y & \text{if } r_t(o, q) < K \\ 0 & \text{otherwise;} \end{cases}$$

and $$f(r_t(o, q)) = g(r_t(o, q))$$
$$= \begin{cases} s_t(o, q)^\delta & \text{if } r_t(o, q) < K \\ 0 & \text{otherwise} \end{cases}$$

is applied in the aggregating function, where K represents a number of retrieved objects, and x, y and δ are each a parameter whose value is preselected.

2. The method of claim 1, wherein the computing of the aggregated score is performed with a computer processor.

3. The method of claim 1, wherein the first media type comprises text and the first component of the multimedia query is a text-based query component.

4. The method of claim 3, wherein the text-based query component comprises a representation of a text document based on word frequencies.

5. The method of claim 1, wherein the second media type comprises images and the second component of the multimedia query is an image-based query component.

6. The method of claim 5, wherein the image-based query component comprises a representation of an image which is based on extracted features.

7. The method of claim 1, wherein the aggregating function is a linear combination of the function of the confidence weighted first comparison measure and the function of the confidence weighted second comparison measure.

8. The method of claim 1, wherein:
$f$ is a function of $r_a(o,q)$; and
$g$ is a function of $r_a(o,q)$.

9. The method of claim 1, wherein x is at least 1, y is at least 0, and δ is greater than 0.

10. The method of claim 1, wherein the aggregating function has the general format:

$$s_{cw}(q,o) = \alpha_a N(s_a(q,o) f(s_a(q,o), r_a(o,q), \theta_a)) + \alpha_b N(s_b(q,o) g(s_a(q,o), r_a(o,q), s_b(q,o), r_b(o,q), \theta_b)) \quad (4)$$

where $0 < \alpha_a < 1$ and $0 < \alpha_b < 1$.

11. The method of claim 1, wherein the aggregating function comprises an average mean operator.

12. The method of claim 1, wherein the outputting information comprises outputting objects from the collection based on their aggregated scores.

13. A system for performing the method of claim 1, comprising non-transitory memory which stores instructions for performing the method and a processor in communication with the memory for executing the instructions.

14. A method for multimedia information retrieval comprising:
querying a multimedia collection with a first component of a multimedia query to generate first comparison measures between the first query component and respective objects in the collection for a first media type;
querying at least a part of the multimedia collection with a second component of the multimedia query to generate second comparison measures between the second query component and respective objects in the collection for a second media type;
computing an aggregated score for each of a set of objects in the collection based on the first comparison measure and the second comparison measure for the object, the computing comprising applying an aggregating function to the first and second comparison measures in which a first confidence weighting is applied to the first comparison measure and a second confidence weighting is applied to the second comparison measure, the first confidence weighting is independent of the second comparison measure and the second confidence weighting is dependent on the first comparison measure; and
outputting information based on the aggregated scores.
wherein the aggregated score is computed using an aggregating function of general format:

$$s_{cw}(q,o) = \alpha_a N(s_a(q,o) f(s_a(q,o), r_a(o,q), \theta_a)) + \alpha_b N(s_b(q,o) g(s_a(q,o), r_a(o,q), s_b(q,o), r_b(o,q), \theta_b)) \quad (4)$$

wherein $0 < \alpha_a < 1$, $0 < \alpha_b < 1$, and $\alpha_b = 1 - \alpha_a$;
$S_{cw}$ is the aggregated score;
a represents the first media type;
b represents the second media type;
$s_a(q,o)$ and $s_b(q,o)$ are similarity scores between the query q and the object o for the first and second media types respectively;
$r_a(o,q)$ and $r_b(o,q)$ are rankings of the object o given by the respective similarity scores $s_a(q,o)$ and $s_b(q,o)$, with respect to other objects in the collection;
$f$ is a function of at least one of $r_a(o,q)$ and $s_a(q,o)$ and optionally also of $\theta_a$;
$g$ is a function of at least one of $r_a(o,q)$ and $s_a(q,o)$ and at least one of $s_b(q,o)$ and $r_b(o,q)$ and optionally also of $\theta_b$;
$\theta_a$ is a set of one or more parameters;
$\theta_b$ is a set of one or more parameters; and
N represents an optional normalizing operator.

15. A computer program product comprising a non-transitory recording medium encoding instructions, which when executed on a computer causes the computer to perform the method of claim 1.

16. A system for multimedia information retrieval comprising:
a search engine for querying an associated multimedia collection with a first component of a multimedia query and for querying at least a part of the queried multimedia collection with a second component of the multimedia query;
a first comparison component for generating a first comparison measure between the first query component and a respective object in the collection for a first media type;
a second comparison component for generating a second comparison measure between the second query component and a respective object in the collection for the second media type;
a multimedia scoring component for generating aggregated scores for each of a set of objects in the collection based on the first comparison measure and the second comparison measure for the respective object, the multimedia scoring component applying an aggregating function which aggregates the first and second comparison measure in which a first confidence weighting is applied to the first comparison measure which is independent of the second comparison measure and a second confidence weighting is applied to the second comparison measure which is dependent on the first comparison measure, wherein the aggregating function is of general format:

$$s_{cw}(q,o)=\alpha_a N(s_a(q,o)f(s_a(q,o),r_a(o,q),\theta_a))+\alpha_b N(s_b(q,o)g(s_a(q,o),r_a(o,q),s_b(q,o),r_b(o,q),\theta_b)$$

wherein $0<\alpha_a<1$, $0<\alpha_b<1$ and $\alpha_b=1-\alpha_a$;
$S_{cw}$ is the aggregated score;
a represents the first media type;
b represents the second media type;
$s_a(q,o)$ and $s_b(q,o)$ are similarity scores between the query q and the object o for the first and second media types respectively;
$r_a(o,q)$ and $r_b(o,q)$ are rankings of the object o given by the respective similarity scores $s_a(q,o)$ and $s_b(q,o)$, with respect to other objects in the collection;
$f$ is a function of at least one of $r_a(o,q)$ and $s_a(q,o)$ and optionally also of $\theta_a$;
g is a function of at least one of $r_a(o,q)$ and $s_a(q,o)$ and at least one of $s_b(q,o)$ and $r_b(o,q)$ and optionally also of $\theta_b$;
$\theta_a$ is a set of one or more parameters;
$\theta_b$ is a set of one or more parameters; and
N represents an optional normalizing operator; and
  a processor for implementing the search engine, first and second comparison components, and multimedia scoring component.

17. The system of claim 16, further comprising the collection of multimedia objects.

18. The system of claim 16, wherein the system is configured for outputting retrieved objects from the collection based on their aggregated scores.

19. The system of claim 16, wherein the system is configured for receiving a multimedia query from a user which includes a textual component and an image component.

20. An information retrieval method comprising:
retrieving a set of objects from a collection based on computed text-based scores for the objects;
computing image-based scores for the retrieved objects;
with a processor, computing an aggregated score for objects in the retrieved set of objects based on the respective text-based and image-based scores in which a first confidence weighting is applied to the text-based score which is independent of the image-based score and a second confidence weighting is applied to the image-based score which is dependent on both the text-based score and the image-based score; and
outputting information based on the aggregated scores,
wherein the aggregated score is computed using an aggregating function of general format:

$$s_{cw}(q,o)=\alpha_a N(s_a(q,o)f(s_a(q,o),r_a(o,q),\theta_a))+\alpha_b N(s_b(q,o)g(s_a(q,o),r_a(o,q),s_b(q,o),r_b(o,q),\theta_b)$$

wherein $0<\alpha_a<1$, $0<\alpha_b<1$, and $\alpha_b=1-\alpha_a$;
$S_{cw}$ is the aggregated score;
a represents a first media type, which comprises text;
b represents a second media type, which comprises images;
$s_a(q,o)$ and $s_b(q,o)$ are similarity scores between the query q and the object o for the first and second media types respectively;
$r_a(o,q)$ and $r_b(o,q)$ are rankings of the object o given by the respective similarity scores $s_a(q,o)$ and $s_b(q,o)$, with respect to other objects in the collection;
$f$ is a function of at least one of $r_a(o,q)$ and $s_a(q,o)$ and optionally also of $\theta_a$;
g is a function of at least one of $r_a(o,q)$ and $s_a(q,o)$ and at least one of $S_{b(q,o)\ and\ rb}(o,q)$ and optionally also of $\theta_b$;
$\theta_a$ is a set of one or more parameters;
$\theta_b$ is a set of one or more parameters; and
N represents an optional normalizing operator.

* * * * *